US012132767B2

(12) United States Patent
Raghuvanshi et al.

(10) Patent No.: US 12,132,767 B2
(45) Date of Patent: Oct. 29, 2024

(54) SYSTEMS AND METHODS FOR PERFORMING AUTOMATIC SESSION CONTROL FUNCTION CHANGE OVER

(71) Applicant: DISH Wireless L.L.C., Englewood, CO (US)

(72) Inventors: Prashant Raghuvanshi, Parker, CO (US); Kevin Yao, Cheyenne, WY (US)

(73) Assignee: DISH WIRELESS L.L.C., Englewood, CO (US)

( * ) Notice: Subject to any disclaimer, the term of this patent is extended or adjusted under 35 U.S.C. 154(b) by 111 days.

(21) Appl. No.: 17/354,823

(22) Filed: Jun. 22, 2021

(65) Prior Publication Data

US 2022/0407897 A1 Dec. 22, 2022

(51) Int. Cl.
*H04L 12/14* (2024.01)
*G06F 11/20* (2006.01)
(Continued)

(52) U.S. Cl.
CPC .......... *H04L 65/1083* (2013.01); *H04L 43/10* (2013.01); *H04L 65/1104* (2022.05);
(Continued)

(58) Field of Classification Search
CPC ............. H04L 65/1083; H04L 65/1016; H04L 41/0663; H04L 12/14; H04L 12/145; H04L 43/10; H04L 65/1006; H04L 67/148; H04L 69/40; H04L 43/0817; H04L 65/1104; H04L 41/5009; H04W 24/10; H04W 36/0011; G06F 11/2048; G06F 11/2023
(Continued)

(56) References Cited

U.S. PATENT DOCUMENTS

| 2009/0196183 A1* | 8/2009 | Kakadia .................. H04L 12/14 370/410 |
| 2010/0034079 A1* | 2/2010 | Boucadair ........... H04L 65/1069 370/352 |
| 2010/0223492 A1* | 9/2010 | Farrugia ............. H04L 65/1104 714/E11.023 |

(Continued)

FOREIGN PATENT DOCUMENTS

WO  WO 2011131240 A1  10/2011

OTHER PUBLICATIONS

International Search Report and Written Opinion, mailed Sep. 27, 2022, for International Patent Application No. PCT/US2022/033848. (17 pages).

(Continued)

*Primary Examiner* — Rebecca E Song
*Assistant Examiner* — Vanneilian Lalchinthang
(74) *Attorney, Agent, or Firm* — Seed IP Law Group LLP (57) ABSTRACT

A session change over system monitors nodes to determine whether they are operational, and transfers user equipment from one node to another when nodes are not operational. The session change over system receives one or more health check messages from one or more foreign nodes which communicate with user equipment. The session change over system inspects each health check message to determine whether a foreign node is not operational. The session change over system identifies user equipment in communication with the foreign node at a time before the foreign node was not operational. The session change over system communicates with the identified user equipment in place of the foreign node.

20 Claims, 7 Drawing Sheets

(51) Int. Cl.
  *H04L 29/06* (2006.01)
  *H04L 43/10* (2022.01)
  *H04L 65/1083* (2022.01)
  *H04L 65/1104* (2022.01)
  *H04L 69/40* (2022.01)
  *H04W 24/10* (2009.01)
  *H04W 36/00* (2009.01)

(52) U.S. Cl.
  CPC ............. *H04L 69/40* (2013.01); *H04W 24/10* (2013.01); *H04W 36/0011* (2013.01)

(58) Field of Classification Search
  USPC .......................................................... 370/331
  See application file for complete search history.

(56) References Cited

U.S. PATENT DOCUMENTS

| | | | | |
|---|---|---|---|---|
| 2012/0036231 A1* | 2/2012 | Thakur | .................... | H04L 67/14 709/227 |
| 2013/0010804 A1* | 1/2013 | Fernandez Alonso | ....................... | H04L 65/104 370/428 |
| 2013/0322242 A1* | 12/2013 | Swenson | ............... | H04W 28/06 370/252 |
| 2014/0359340 A1* | 12/2014 | Hua | .................... | H04L 65/1063 714/4.11 |
| 2018/0167420 A1* | 6/2018 | Shukla | ................ | H04L 65/1104 |
| 2019/0238449 A1* | 8/2019 | Michael | ................ | H04L 45/121 |
| 2020/0177486 A1* | 6/2020 | Bisht | ....................... | H04L 43/10 |
| 2020/0192772 A1* | 6/2020 | Asveren | .............. | G06F 11/2023 |
| 2020/0389491 A1* | 12/2020 | Buck | .................. | H04L 63/1466 |
| 2021/0306383 A1* | 9/2021 | Muravlyannikov | .. | H04L 67/147 |
| 2021/0328858 A1* | 10/2021 | Asveren | ............. | G06F 9/45558 |
| 2022/0046119 A1* | 2/2022 | Chandrasekaran | ......................... | H04L 65/1073 |

OTHER PUBLICATIONS

"3rd Generation Partnership Project; Technical Specification Group Core Network and Terminals; Study on IP Multimedia Subsystem (IMS) Proxy Call Session Control Function (P-CSCF) restoration procedures (Release 12)", CT WG4 V12.1.0, 3GPP TR 29.806, 3rd Generation Partnership Project (3GPP), Mobile Competence Centre, 650 Route Des Lucioles, Sophia-Antipolis, Cedex, France F-06921, Dec. 2014, 62 pages.

* cited by examiner

300 user equipment data table

| Device IP | Device is Local | Originating SBC | |
|---|---|---|---|
| 155.160.132.203 | True | SBCa | } 301 |
| 155.160.132.206 | True | SBCa | } 302 |
| 155.243.132.026 | False | SBCb | } 303 |
| ⋮ | ⋮ | ⋮ | |

400 health check message data table

| Originating SBC | Time Recieved | Device IP addresses | |
|---|---|---|---|
| SBCa | 5/1/21 3:00 pm | 155.160.132.203 | } 401 |
| SBCa | 5/1/21 3:05 pm | 155.160.132.203<br>155.160.132.206 | } 402 |
| SBCb | 5/1/21 3:00 pm | 155.243.132.026 | } 403 |
| ⋮ | ⋮ | ⋮ | |

SYSTEMS AND METHODS FOR PERFORMING AUTOMATIC SESSION CONTROL FUNCTION CHANGE OVER

BRIEF SUMMARY

A session border controller (SBC) is deployed in networks, such as 5G/4G networks, SIP (Session Initiation Protocol) based VoIP networks, etc., to manage sessions between different parts of a network. In the case of a telephone network, the sessions may be calls between two telephones, and the SBC may include a proxy call session control function ("P-CSCF"). When an SBC becomes unoperational, a session is typically routed through a secondary SBC in order to maintain the session. However, because the secondary SBC does not know where the session originated or when the SBC has been restored, the secondary SBC cannot automatically transfer the session back to the original SBC. Furthermore, transferring a session back to the original SBC may require a maintenance window because the sessions must be transferred manually. Thus, a network bottleneck is created as one SBC has more sessions than usual, and another has fewer sessions than usual, with no way to automatically transfer the sessions, unless the user device is powercycled, rebooted, or otherwise reattached to the network.

The embodiments disclosed herein address the issues above and thus help solve the above technical problems and improve the technology of large-scale networks by providing a technical solution that automatically transfers sessions back to the original SBC. Additionally, the embodiments disclosed herein are further able to allow SBCs to track the operational status of other SBCs in the network. Furthermore, the embodiments disclosed herein allow SBCs to determine which SBC a device originally connected to, in order to transfer that device back to its original SBC.

In some embodiments a session change over system receives one or more health check messages from foreign nodes (which may be alternate SBC's or P-CSCF's) in communication with user devices, inspects the health check messages to determine whether the foreign node is not operational, identifies user equipment devices (or "user equipment") which were communicating with the foreign nodes, and begins communication with each of the identified user devices. In some embodiments, the session change over system communicates with user equipment devices, transmits a health check message to one or more foreign nodes, and reconnects to the user equipment devices after the user equipment devices lost their connection to the node and had been connected to at least one of the foreign nodes. In some embodiments, the session change over system includes a node reconnection data structure which is used to communicate with at least one user equipment device previously in communication with a foreign node and determine whether the foreign node is not currently operational.

DETAILED DESCRIPTION

Nodes, such as SBCs, within a network, such as a 5G/4G network, may be used to route and manage sessions, such as voice calls, video calls, VoIP calls, etc., for user equipment. The nodes may become unoperational, or may "go down," for a variety of reasons, such as: power failure, a drop in the number of sessions the node can manage, a server error, a computer error, a system error, an attack by a malicious third party, a maintenance window, or any other situation where a node is unable to perform at full capacity. A node may additionally be categorized as "unoperational" when it is unable to meet quality of service standards for the user equipment connected to the node. When a node becomes unoperational, the user equipment with a session controlled by the node is transferred to a second, or "foreign," node, which then manages and controls the session for the user equipment. It is currently difficult to transfer the session from the foreign node back to the original node when the node becomes operational again. In order to do so, network engineers must manually inspect and transfer over sessions from the foreign node back to the original node. The manual transfer of sessions additionally requires a maintenance period for both nodes, which creates additional downtime for both nodes, and negatively impacts the user experience for users of the user equipment, and which may also cause network downtime.

The embodiments disclosed herein address the issues above and help solve the above technical problems and improve the technology of large-scale networks by providing a technical solution that automatically transfers sessions back to their original node after the original node becomes unoperational. A session change over system additionally uses one or more health check messages passed between nodes in order to determine whether the nodes are operational, unoperational, have resumed operation, etc. The session change over system also allows a node to determine which node user equipment originally connected to, so the user equipment can be transferred back to that node when it resumes operation. In some embodiments, the nodes are SBCs. The nodes may include a proxy call session control function.

In some embodiments, a plurality of the nodes in a network transmit one or more health check messages to each other. Each node may periodically transmit a health check message. The health check messages may be a ping, a SIP message, or any other method of determining whether a computing system is able to communicate with other computing systems. The health check messages may include a time to arrival, a measure of jitter, quality of service attributes, and other network measurement characteristics.

In some embodiments, the health check message includes a list of user equipment connected to the node. The list of user equipment may include an identifier for each user equipment device, such as: a network address, such as an IP address, a MAC address, or other network addresses; a serial number; a unique ID assigned to the user equipment; or other methods of identifying a user equipment device. The node may identify the user equipment in the list of user equipment as user equipment which is connected to the node which sent the health check message (a "foreign" node).

In some embodiments, the node determines whether a foreign node is unoperational based on a health check message received from the foreign node. The node may determine whether the foreign node is operational based on a variety of factors, such as the quality of service provided by the node, the time for the health check message to arrive, jitter, and other network measurement characteristics. The node may determine that the foreign node is not operational based on a determination that it has not received a health check message from the foreign node within a predetermined time period. The node may begin communication with user equipment which was connected to the foreign node after it is determined that the foreign node is unoperational. The node may establish a proxy redirecting the new signalling responses to the foreign node's network address for user equipment to communicate with. The node may establish a proxy with the foreign node's network address for the user equipment to communicate with. The user equipment may communicate with the node and the foreign node by using SIP, or any other network communication protocol. The foreign node may use SIP redirection response codes to establish the proxy, such as a SIP 305 response when the user equipment re-registers with the SBC to send the user equipment back to it's original node.

In some embodiments, the node receives a health check message from a foreign node after the foreign node becomes unoperational. The node may determine whether the foreign node has resumed operation based on the received health check message. The node may transfer the sessions and user equipment which originated at the foreign node back to the foreign node. The node may determine whether the foreign node has resumed partial operation based on the received health check message. In such embodiments, the node may determine whether a portion of the sessions and user equipment can be transferred back to the foreign node.

In some embodiments, the session change over system includes a node reconnection data structure used to reconnect user equipment devices to their original nodes when the original node resumes operation. The session change over system may include information indicating foreign nodes. The session change over system may include information indicating health check messages form the foreign nodes. The session change over system may include information indicating user equipment devices connected to each of the foreign nodes. The information indicating the user equipment devices may comprise a network address for each user equipment device.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
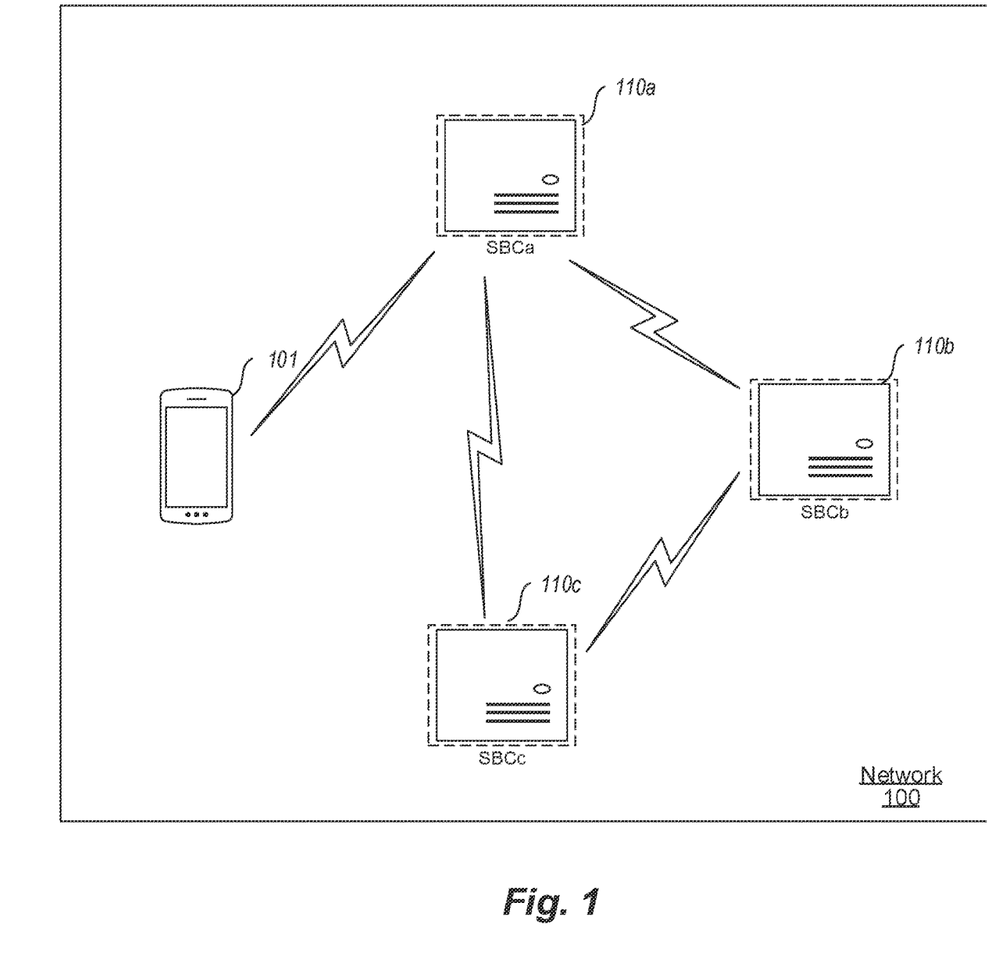
FIG. 1 is a display diagram showing an example network in which the session change over system operates, according to various embodiments described herein.

FIG. 1 is a display diagram showing an example network 100 in which the session change over system operates, according to various embodiments described herein. It is to be appreciated that FIG. 1 illustrates just one example of a network in which a network state tracking system operates, and that various embodiments discussed herein are not limited to the use of such an environment. The network 100 includes user equipment 101 and one or more nodes 110a-110c.

The network 100 is a network, communication system, or networked system (not shown), to which the user equipment 101, as well as nodes 110a-110c and other endpoint devices (not shown) may be coupled. Non-limiting examples of such a network or communication system include, but are not limited to, a telephone network, a 5G network, enterprise networks, cellular networks, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cable networks, or the like. One or more endpoint devices, such as smartphones, tablets, VoIP devices, laptop computers, PCs, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the user equipment 101, nodes 110a-110c, and any other interconnected endpoint devices, to communicate with each other.

The nodes 110a-110c may be SBCs, as illustrated in FIG. 1, or any other network function which manages incompatible signaling sessions from user equipment devices. The nodes may utilize signaling protocols such as SIP, H.323, MGCP, and other call-signaling protocols. The nodes may route messages and sessions by sending a "use proxy 305" message, or a similar message, with the address of the original node managing the session before the original node became unoperational. The nodes may manage sessions between user equipment devices which use different signaling protocols. The node may integrate a proxy call session control function (P-CSCF), an application gateway, a border gateway function, etc.

The nodes 110a-110c may communicate or interconnect with user equipment devices 101, as well as with other nodes. The nodes may transmit health check messages representing the node's status, user devices connected to the node, measurements of network characteristics of the node, etc., to one or more other nodes.

The user equipment 101 may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc.,—routers, digital assistants, personal assistant devices—such as Amazon Alexa, Google Home, etc.,—drones, etc. The user equipment 101 may interconnect to one or more communications media or sources, such as routers, network switches, modems, etc., to transmit communications to other devices. The user equipment may interconnect to the one or more communications media or sources by using a node, such as the nodes 110a-110c.

The above description of the network 100, and the various devices therein, is intended as a broad, non-limiting overview of an example environment in which various embodiments of a session change over system can operate. The network 100, and the various devices therein, may contain other devices, systems and/or media not specifically described herein.

Example embodiments described herein provide applications, tools, data structures and other support to implement systems and methods for managing the state of a network. The example embodiments described herein additionally provide applications, tools, data structures and other support to implement systems and methods for transferring sessions from one node to another in the event that a node becomes unoperational. Other embodiments of the described techniques may be used for other purposes, including for detecting when a node has resumed operation, and transferring sessions back to the node. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
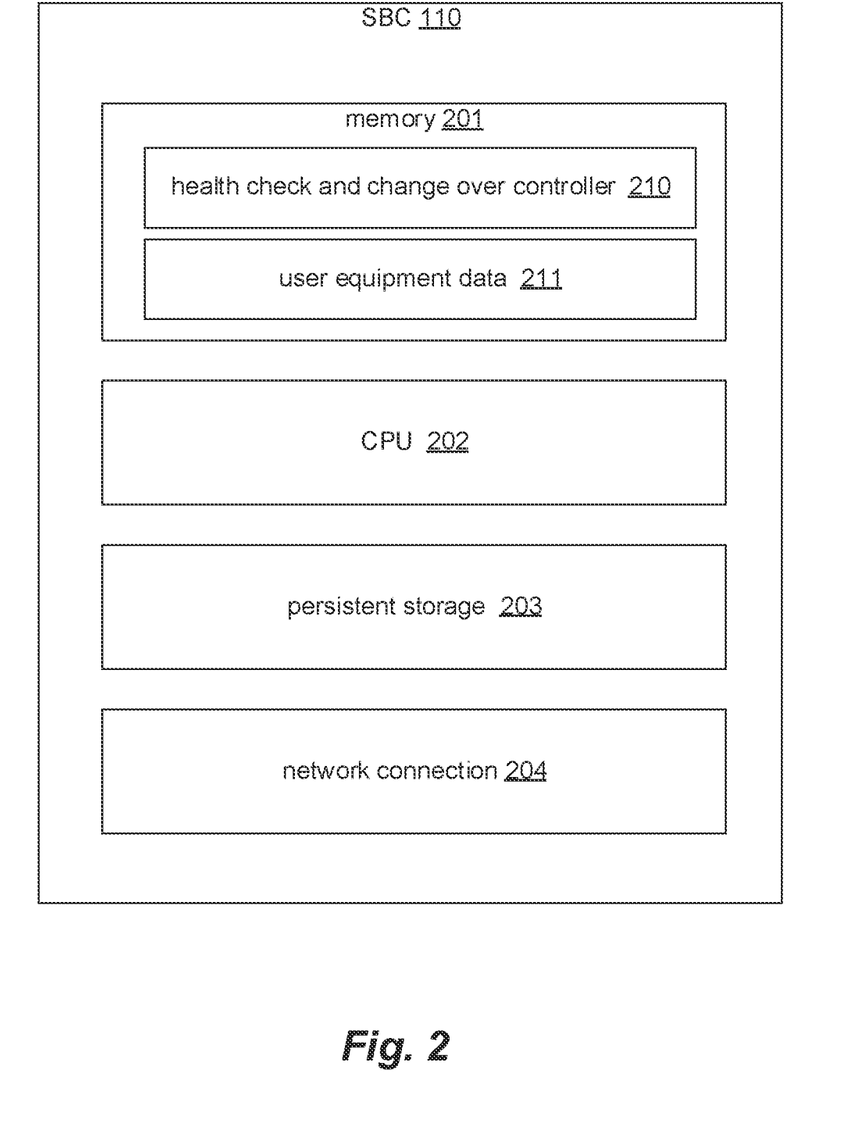
FIG. 2 is a block diagram depicting example components incorporated in a node, according to various embodiments described herein.

FIG. 2 is a block diagram depicting example components incorporated in a node 110, according to various embodiments described herein. In FIG. 2, the node 110 is an SBC, however other similar controllers, nodes, etc., may be used. In various embodiments, the SBC includes one or more of the following: a computer memory 201 for storing programs and data while they are being used, including data associated with other nodes such as nodes 110a-110c, data associated with user equipment 101 connected to the SBC, an operating system including a kernel, and device drivers; a central processing unit (CPU) 202 for executing computer programs; a persistent storage device 203, such as a hard drive or flash drive for persistently storing programs and data; and a network connection 204 for connecting to one or more nodes, such as nodes 110a-110c, and/or other computer systems, connecting to one or more user equipment devices 101, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from nodes 110a-110c, user equipment devices 101, and/or other endpoint devices. In various embodiments, the SBC 110 additionally includes input and output devices, such as a keyboard, a mouse, display devices, etc.

While an SBC 110 configured as described may be used in some embodiments, in various other embodiments, the SBC 110 may be implemented using devices of various types and configurations, and having various components. In various embodiments, the SBC is implemented as part of a data center, such as a national data center, regional data center, etc. In various embodiments, the SBC is implemented as a virtual machine. In various embodiments, the SBC is implemented as one or more functions performed by computing systems in a data center.

The memory 201 may include a health check and change over controller 210, which contains computer-executable instructions that, when executed by the CPU 202, cause the SBC 110 to perform the operations and functions described herein. For example, the programs referenced above, which may be stored in computer memory 201, may include or be comprised of such computer-executable instructions. The memory 201 may also include user equipment data 211, which includes data describing user equipment devices connected the SBC. In some embodiments, the user equipment data 211 additionally includes data indicating whether one or more user equipment devices were originally in communication with a foreign SBC.

The health check and change over controller 210 and user equipment data 211 perform the core functions of the session change over system, as discussed herein and also with respect to FIGS. 3-8. In particular, the health check and change over controller 210 transmits health check messages to other nodes, receives health check messages from other nodes, determines whether a node is operational, and transfers user equipment to and from the SBC 110.

The user equipment data 211 includes data describing user equipment connected to the SBC 110. The data describing the user equipment may include an identifier for each particular user equipment device. The data describing the network status may also include data indicating whether the user equipment device is a "foreign" user equipment device, in the sense that the user equipment device "belongs" to a foreign node.

In an example embodiment, the health check and change over controller 210 and/or computer-executable instructions stored on memory 201 of the SBC 110 are implemented using standard programming techniques. For example, the health check and change over controller 210 and/or computer-executable instructions stored on memory 201 of the SBC 110 may be implemented as a "native" executable running on CPU 202, along with one or more static or dynamic libraries. In other embodiments, the health check and change over controller 210 and/or computer-executable instructions stored on memory 201 of the SBC 110 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the session change over system and the SBC 110.

In addition, programming interfaces to the data stored as part of the health check and change over controller 210 and user equipment data 211 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The health check and change over controller 210 and user equipment data 211 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the session change over system, nodes 110a-110c, and/or the user equipment 101.

Furthermore, in some embodiments, some or all of the components/portions of the health check and change over controller 210, and/or functionality provided by the computer-executable instructions stored on memory 201 of the SBC 110 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, nodes, devices, functions, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 3:
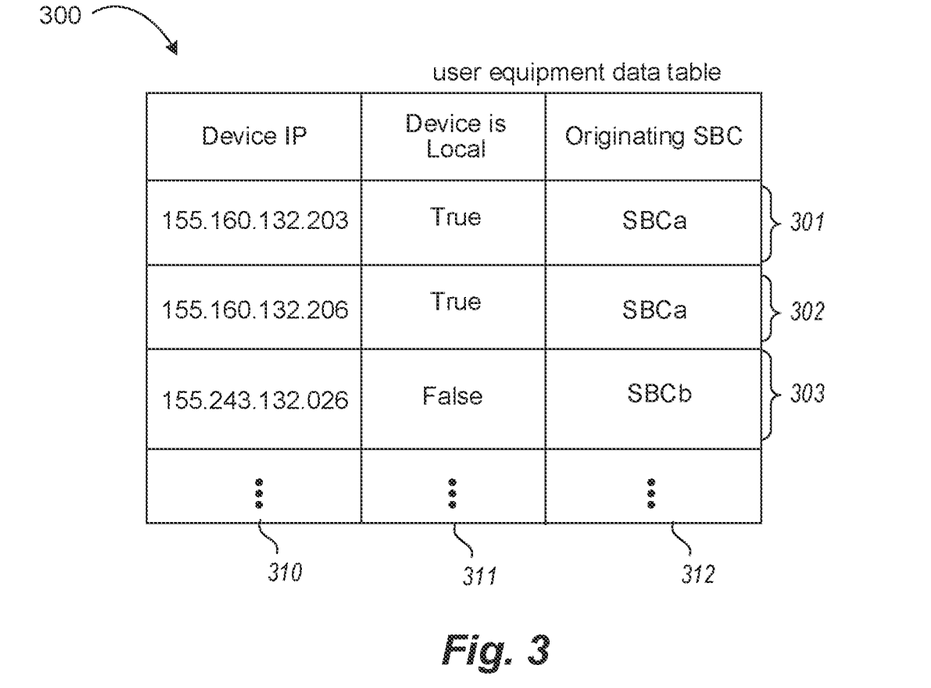
FIG. 3 is a table diagram representing a user equipment data table, according to various embodiments described herein.

FIG. 3 is a table diagram representing a user equipment data table 300, according to various embodiments described herein. The user equipment data table 300 includes a device IP column 310, a local device column 311, and an originating SBC column 312. A node, such as the SBC 110, may use the user equipment data table 300 to track the user equipment devices connected to the node. The device IP column 310 includes information indicating an IP address, such as IPv4, IPv6, or dual stack, for a user equipment device connected to an SBC. In some embodiments, the device IP column 310 is used to identify the user equipment device connected to the SBC. In some embodiments, the user equipment data table includes other information used to identify the device, such as a network address, serial number, generated unique identifier for the device, or other identifiers for a device. The local device column 311 includes information identifying whether the device is a local device which originally connected to the SBC or a foreign device which was transferred to the SBC from a different SBC. The originating SBC column 312 includes information identifying the SBC which the device originally connected to. For example, the devices identified in rows 301 and 302 are identified as local devices which are originally connected to SBCa. In contrast, the device identified in row 303 is not a local device and was originally connected to SBCb.

In some embodiments, the SBC determines whether a user equipment device belongs to a foreign device based on the IP address of the foreign device. The SBC may assign user equipment devices an IP address from a pool of IP addresses when they connect to the SBC. The SBC may receive an indication of the pool of IP addresses used by a foreign SBC, and then may identify a user equipment device as originating from that foreign SBC based on the pool of IP addresses used by the foreign SBC. In such embodiments, if multiple SBCs become unoperational, the user equipment device can be transferred back to its original SBC without being transferred to any intervening SBCs. In some embodiments, this functionality is performed by including an indication of which devices currently connected to the SBC originated from a foreign SBC within a health check message.

Figure 4:
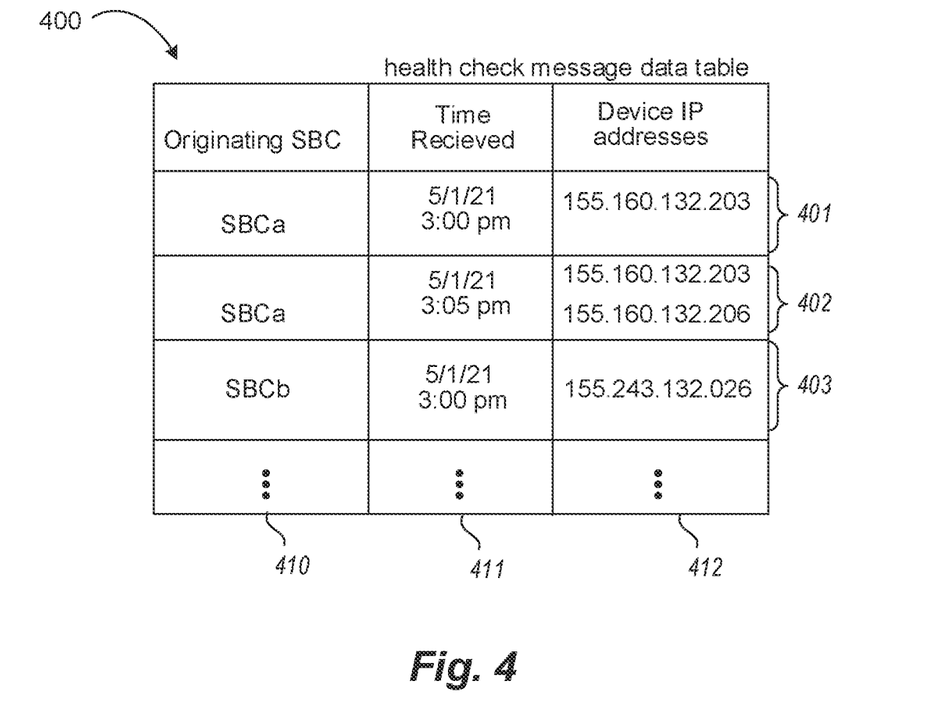
FIG. 4 is a table diagram representing a health check message data table, according to various embodiments described herein.

FIG. 4 is a table diagram representing a health check message data table 400, according to various embodiments described herein. A node, such as the SBC 110, may use the health check message data table 400 to store health check messages obtained from other SBCs or nodes. The health check message data table 400 includes an originating SBC column 410, a time received column 411, and a device IP addresses column 412. The originating SBC column 410 includes information indicating which SBC the health check message was obtained from. The time received column 411 includes information indicating when the health check message was received. The device IP addresses column 412 includes information indicating IP addresses used to identify devices connected to the SBC sending the health check message. In some embodiments, information other than IP addresses are used to identify the devices connected to the SBC sending the health check message, such as a network address, serial number, generated unique identifier for the device, or other identifiers for a device. In some embodiments, the health check message data table 400 additionally includes information included in the health check message, such as a time to arrival, a measure of jitter, quality of service attributes, and other network measurement characteristics. For example, rows 401 and 402 each include information indicating health check messages received from SBCa at two different times, and show that at some point between the two health check messages another device connected to SBCa.

Figure 5:
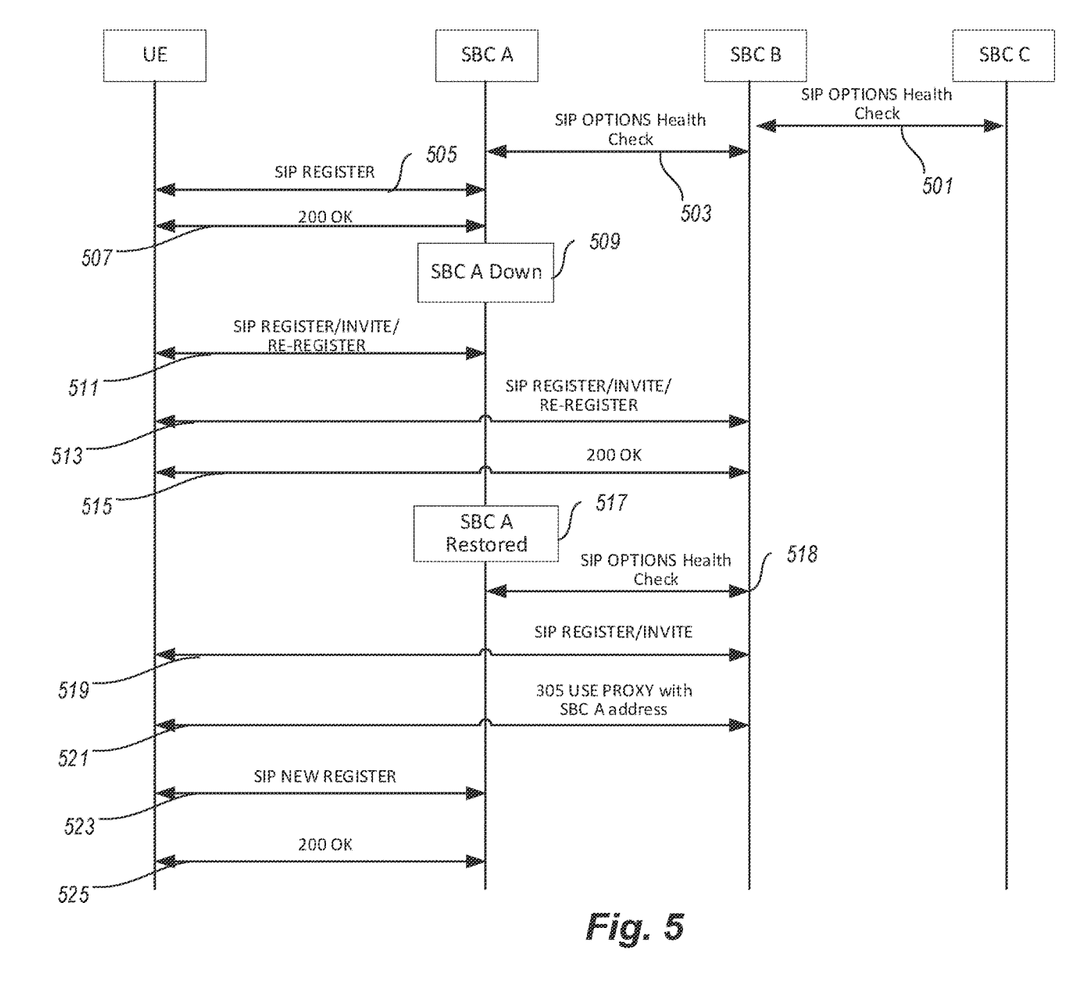
FIG. 5 is a flow diagram depicting an example scenario for session change over, according to various embodiments described herein.

FIG. 5 is a flow diagram depicting an example scenario for session change over, according to various embodiments described herein. At 501, SBC B and SBC C exchange health check messages. In some embodiments, the health check message is sent via the SIP protocol. The health check message may use a SIP OPTIONS request. At 503, SBC A and SBC B exchange health check messages. In some embodiments, the health check messages are exchanged multiple times, such as periodically, in response to a request by another SBC, etc. At 505, SBC A registers user equipment (UE) to communicate with SBC A. SBC A may register the user equipment by using the SIP protocol. At 507, SBC A transmits a "200 OK" message to the UE, indicating to the UE that it is registered on SBC A.

At 509, SBC A becomes unoperational. In some embodiments, SBC B determines that SBC A is unoperational based on the last health check message obtained from SBC A. At 511, the UE attempts to re-register with SBC A. At 513, after the UE is unable to re-register with SBC A, the UE re-registers with SBC B. In some embodiments, SBC B initiates the re-registration with the UE. At 515, SBC B transmits a "200 OK" message to the UE, indicating to the UE that it is registered on SBC B.

At 517, SBC A is restored. At 518, SBC A transmits a health check message to SBC B, and SBC B determines whether SBC A is restored based on the health check message. At 519, the SBC B registers the UE again. At 521, SBC B creates a proxy with SBC A's address to transfer the UE back to SBC A. SBC B may use SIP redirection response codes to establish the proxy, such as a SIP 305 response when the user equipment re-registers with SBC B. At 523, SBC registers the UE. At 525, SBC A transmits a "200 OK" message to the UE, indicating to the UE that it is registered on SBC A.

Figure 6:
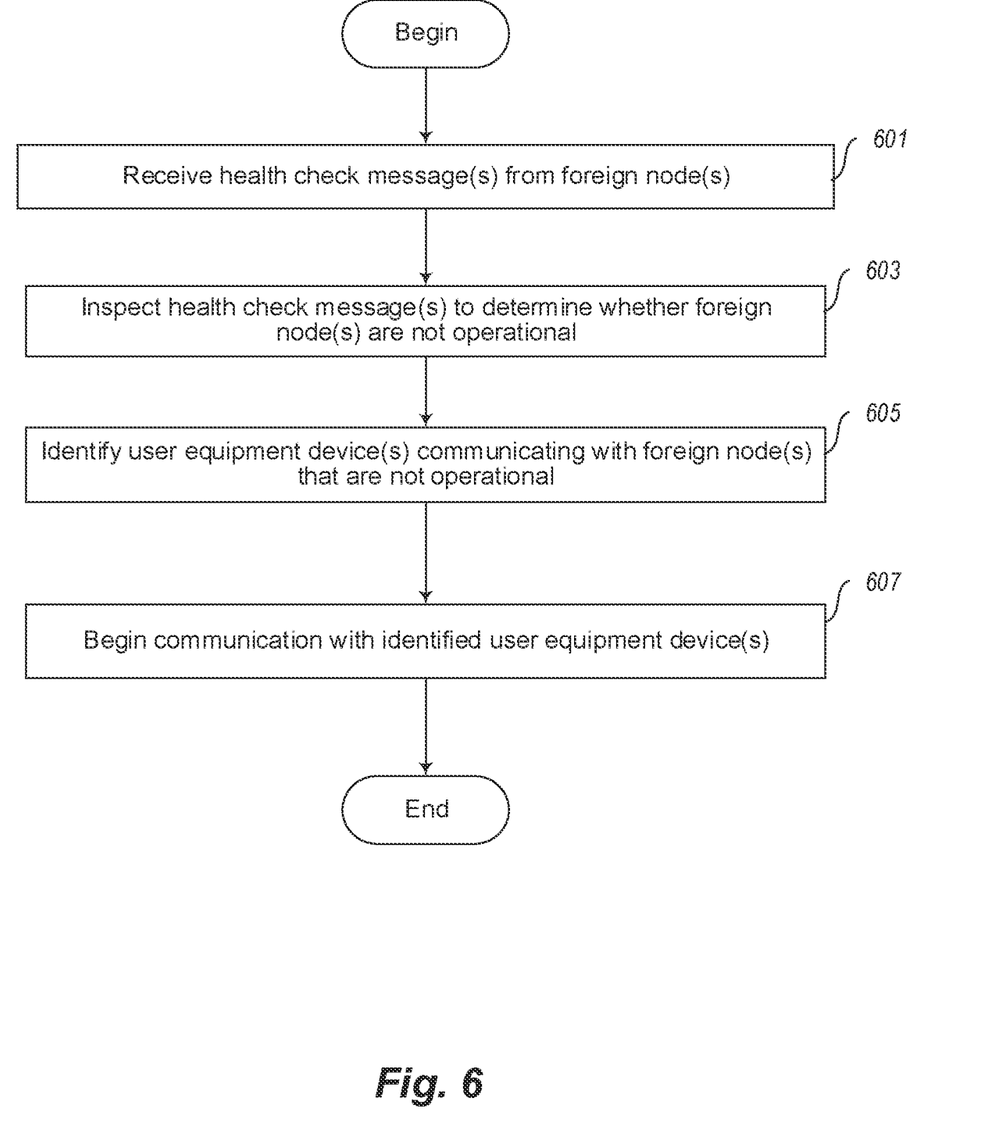
FIG. 6 is a flow diagram depicting a process for transferring a foreign node's user equipment devices to a node, according to various embodiments described herein.

FIG. 6 is a flow diagram depicting a process for transferring a foreign node's user equipment devices to a node, according to various embodiments described herein. At act 601, a node receives one or more health check messages from one or more foreign nodes. In some embodiments, the health check messages include a list of user equipment devices connected to the foreign node which sent the health check message. The health check messages may be received periodically. The health check messages may be sent via a SIP request.

At act 603, the node inspects the health check messages to determine whether one or more foreign nodes are not operational. In some embodiments, the node determines whether a foreign node is not operational based on one or more of: a determination that the foreign node has not sent a health check message within a predetermined period of time; a change in the quality of service provided by the foreign node; a change in measured network characteristics of the foreign node; or any other indication that the node is not able to operate at full capacity.

At act 605, the node identifies one or more user equipment devices which communicated with a foreign node that is not operational. In some embodiments, the node identifies the one or more user equipment devices based on one or more of: a list of user equipment devices in a health check message transmitted by the foreign node; a network address, such as an IP address, MAC address, or other network address, of the user equipment devices; a hardware or other unique identifier of the user equipment devices; etc.

At act 607, the node begins communication with the identified user equipment devices. After act 607, the process ends.

In some embodiments the node is an SBC. In some embodiments, the node comprises a proxy call session control function. In some embodiments, the node communicates with the user equipment devices by using the SIP protocol.

Figure 7:
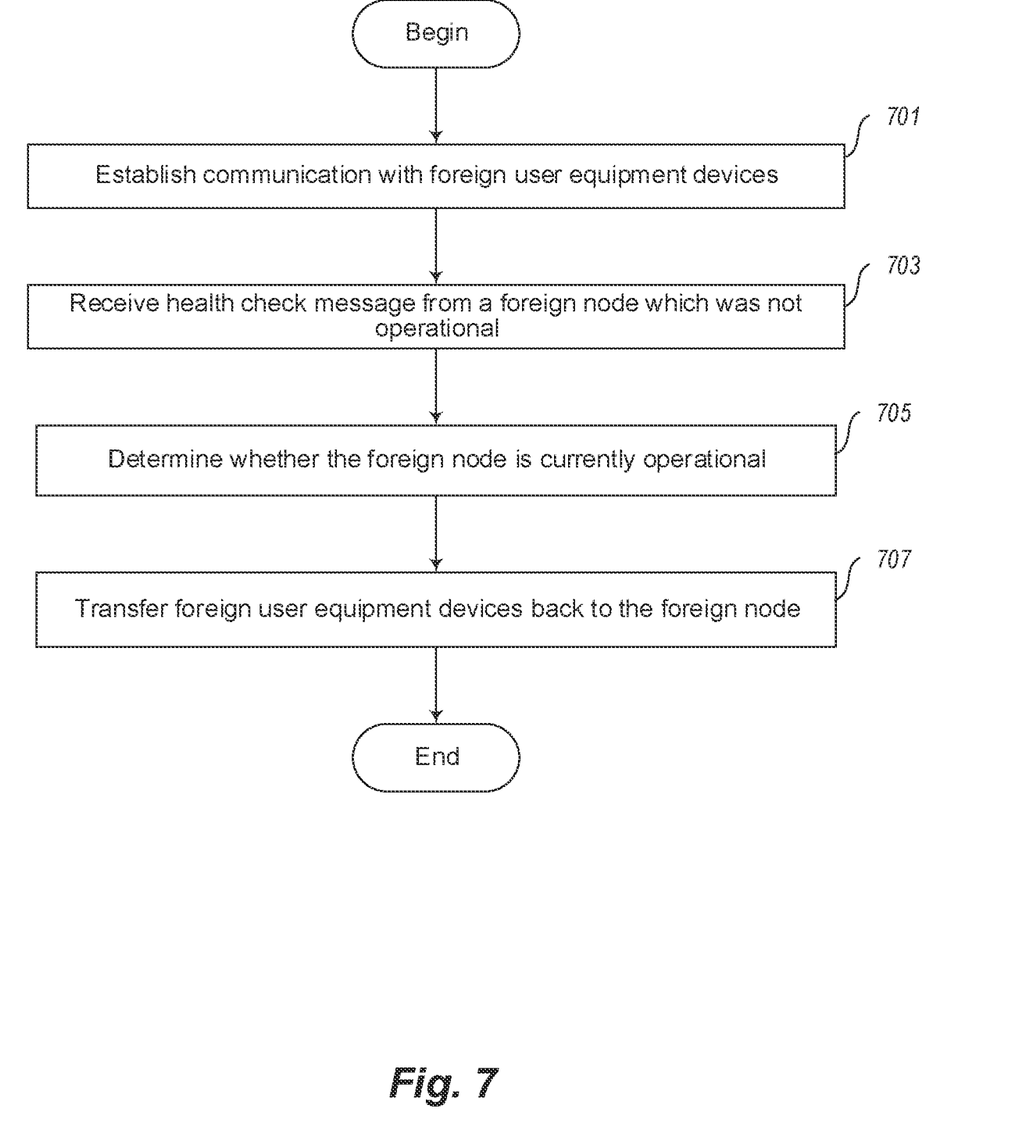
FIG. 7 is a flow diagram depicting a process for transferring a foreign node's user equipment devices back from a node, according to various embodiments described herein.

FIG. 7 is a flow diagram depicting a process for transferring a foreign node's user equipment devices back from a node, according to various embodiments described herein. At act 701, a node establishes communication with foreign user equipment devices which previously communicated with a foreign node which was not operational. At act 703, the node receives a health check message from the foreign node which was not operational.

At act 705, the node determines whether the foreign node is currently operational. In some embodiments, the node determines whether the foreign node is currently operational based on the health check message. The node may determine that the foreign node is partially operational based on the health check message.

At act 707, the node transfers the foreign user equipment devices back to the foreign node. In some embodiments, the node transfers the foreign user equipment devices back to the foreign node by using a proxy. The node may use SIP redirection response codes to establish the proxy, such as a SIP 305 response when the user equipment re-registers with the node. The node may transfer a portion of the foreign user equipment devices back to the foreign node based on a determination of whether the foreign node is at least partially operational.

After act 707, the process ends.

Figure 8:
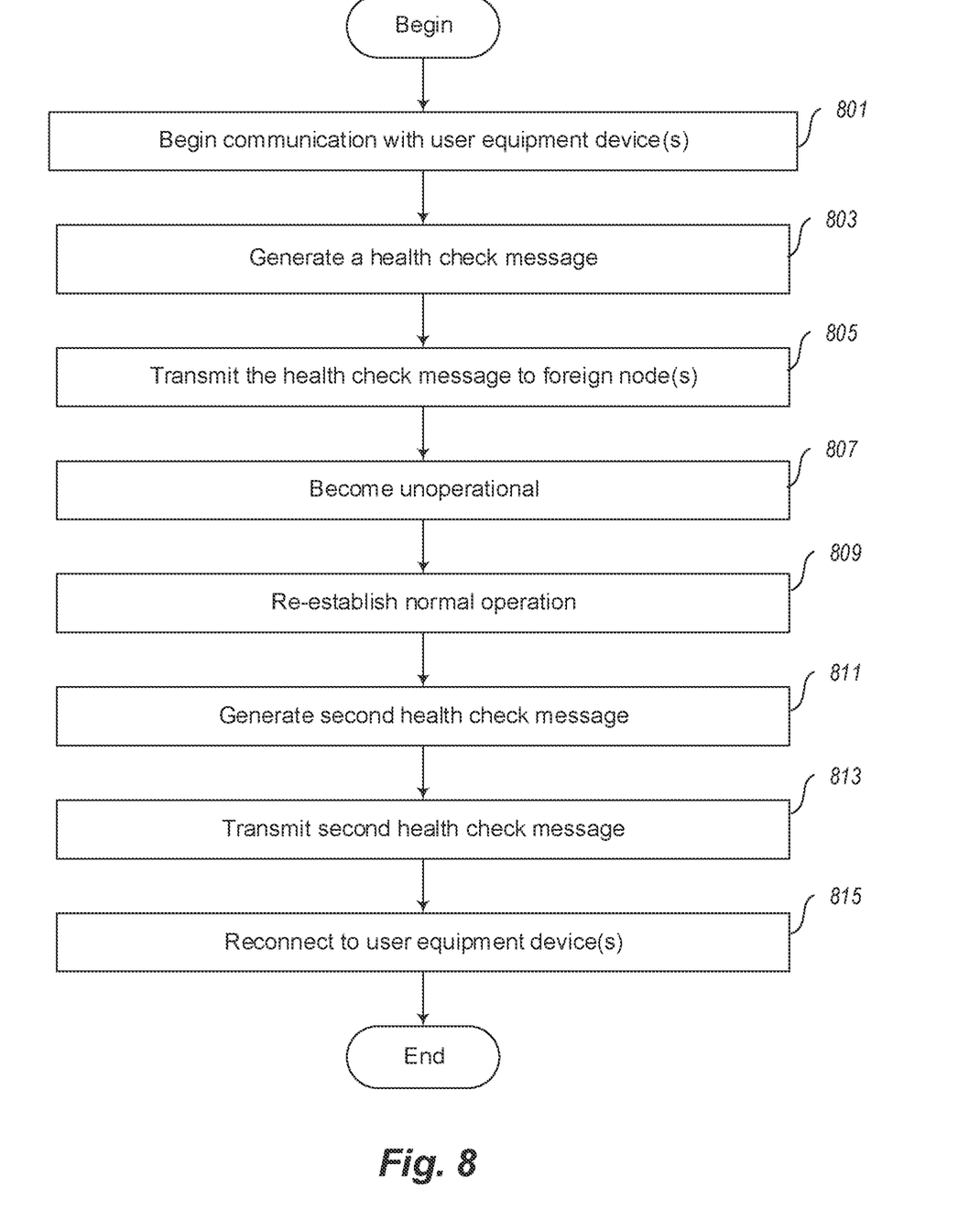
FIG. 8 is a flow diagram depicting a process to transfer health check messages from foreign nodes and reconnect with user equipment devices, according to various embodiments described herein.

FIG. 8 is a flow diagram depicting a process to transfer health check messages from foreign nodes and reconnect with user equipment devices, according to various embodiments described herein. At act 801, a node begins communication with one or more user equipment devices. The node may communicate with the one or more user equipment devices by using a signaling protocol, such as SIP.

At act 803, the node generates a health check message. The health check message may include an indication of the one or more user equipment devices in communication with the node. The health check message may include an indication of the quality of service provided by the node, time to arrival, jitter, and other network measurement characteristics. At act 805, the node transmits the health check message to one or more foreign nodes. In some embodiments, the node performs acts 803 and 805 periodically.

At act 807, the node becomes unoperational. The node may become unoperational for a variety of reasons, such as: power failure, a drop in the number of sessions the node can manage, a server error, a computer error, a system error, an attack by a malicious third party, a maintenance window, or any other situation where a node is unable to perform at full capacity. The node may also be considered unoperational if it cannot communicate with as many user equipment devices as it usually can.

At act 809, the node resumes normal operation. In some embodiments, the node becomes partially operational at act 809, in that it is able to operate at less than normal levels or capacity. At act 811, the node generates a second health check message. At act 813, the node transmits the second health check message to a foreign node.

At act 815, the node reconnects to the user equipment devices. In some embodiments, the foreign node uses a proxy to reconnect the user equipment devices to the foreign node. The foreign node may use SIP redirection response codes to establish the proxy, such as a SIP 305 response when the user equipment re-registers with the SBC.

After act 815, the process ends. In some embodiments, the node is an SBC. In some embodiments, the node utilizes a proxy call session control function.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, the system comprising:
    at least one processor; and
    at least one memory coupled to the at least one processor, the memory having computer-executable instructions stored thereon that, when executed by the at least one processor, cause the system to:
        electronically establish communication with first one or more user equipment devices;
        during a first time frame:
            electronically receive one or more health check messages, each health check message being transmitted from at least one foreign node of one or more foreign nodes, each foreign node of the one or more foreign nodes having established communication with one or more user equipment devices;
            electronically inspect each health check message of the one or more health check messages to determine whether a respective foreign node of the one or more foreign nodes is not operational;
            electronically identify second one or more user equipment devices which were in communication with the respective foreign node before the respective foreign node was not operational based on at least one health check message received from the respective foreign node, wherein the second one or more user equipment devices are separate from the first one or more user equipment devices;
            electronically record data indicating that the second one or more user equipment devices were previously connected to the respective foreign node before the foreign node was not operational;
            electronically establish communication with the second one or more user equipment devices such that the system manages the established communications with the first one or more user equipment devices and the second one or more user equipment devices; and
        during a second time frame after the first time frame:
            electronically determine that the respective foreign node has become operational based on a health check message received from the respective foreign node; and
            based on the determination that the respective foreign node has become operational:
                electronically utilize the recorded data to identify the second one or more user equipment devices that were previously connected to the respective foreign node and to which communication has been established;
                electronically re-establish communication with the respective foreign node after the respective foreign node has become operational, such that additional health check messages are able to be received from the respective foreign node; and
                electronically cause the second one or more user equipment devices to re-establish communication with the respective foreign node.

2. The system of claim 1, wherein each health check message of the one or more health check messages further comprises:
    a list of one or more user equipment devices in communication with a foreign node that originated the health check message.

3. The system of claim 2, wherein the list of one or more user equipment devices include at least one network address for each user equipment device in the list of one or more user equipment devices.

4. The system of claim 1, wherein the one or more health check messages are received periodically.

5. The system of claim 1, wherein, to determine that the respective foreign node has become operational, the computer-executable instructions further cause the system to:
    electronically detect that the foreign node has transmitted at least one health check message after the first time frame.

6. The system of claim 1, wherein the system further comprises a session border controller.

7. The system of claim 1, wherein the system further comprises a proxy call session control function.

8. The system of claim 1, wherein beginning communication with the identified one or more user equipment devices comprises transmitting a SIP request.

9. One or more storage devices collectively storing a node reconnection data structure for access and processing by a program executed by at least one computer processor that, when accessed and processed by the at least one computer processor, functionally enables the at least one computer processor to:
    communicate with first one or more user equipment devices;
    at a first time:
        determine whether a foreign node is not currently operational;
        communicate with at least one user equipment device that was previously in communication with the foreign node that is not currently operational;
        record data indicating that the at least one user equipment device was previously in communication with the foreign node that is not currently operational; and
        manage a session with the at least one user equipment device via a first session initiation protocol request; and
    at a second time:

determine whether the foreign node has resumed operation based on a health check message transmitted by the foreign node;
identify second one or more user equipment devices that were previously in communication with the foreign node and for which a session is managed based on the recorded data, wherein the second one or more user equipment devices are separate from the first user equipment devices; and
cause the session of the second one or more user equipment devices to be managed by the foreign node via a second session initiation protocol request;
wherein the node reconnection data structure comprises:
information indicating one or more foreign nodes;
information indicating one or more health check messages obtained from each foreign node of the one or more foreign nodes; and
information indicating one or more user equipment devices in communication with each foreign node of the one or more foreign nodes, wherein:
the information indicating one or more user equipment devices in communication with the foreign node is obtainable from one or more health check messages which were obtained from the foreign node;
the information indicating one or more health check messages for the foreign node is usable to determine whether the foreign node is not currently operational and whether the foreign node has resumed operation;
the information indicating the one or more user equipment devices is usable to establish the session between the at least one user equipment device and the computer processor via the first session initiation protocol request based on the determination that the foreign node is not currently operational; and
the information indicating the one or more user equipment devices is usable to establish the session between the second one or more user equipment devices and the foreign node via the second session initiation protocol request based on a determination that the foreign node is currently operational.

10. The one or more storage devices of claim 9, wherein, to determine whether the foreign node has resumed operation, the at least one computer processor is functionally further able to:
detect that the foreign node has transmitted at least one health check message after the first time.

11. The one or more storage devices of claim 9, wherein each of the one or more health check messages obtained from each foreign node of the one or more foreign nodes further comprises information indicating the one or more user equipment devices in communication with a foreign node.

12. The one or more storage devices of claim 11, wherein the information indicating the one or more user equipment devices further comprises a network address for each user equipment device of the one or more user equipment devices.

13. A non-transitory processor-readable storage medium that stores at least one of instructions or data, the instructions or data, when executed by at least one processor, cause the at least one processor to:
establish communication with first one or more user equipment devices;
during a first time frame:
receive one or more health check messages, each health check message being transmitted from at least one foreign node of one or more foreign nodes, each foreign node of the one or more foreign nodes having established communication with one or more user equipment devices;
inspect each health check message of the one or more health check messages to determine whether a respective foreign node of the one or more foreign nodes is not operational;
identify second one or more user equipment devices which were in communication with the respective foreign node before the respective foreign node was not operational based on at least one health check message received from the respective foreign node, wherein the second one or more user equipment devices are separate from the first one or more user equipment devices;
record data indicating that the second one or more user equipment devices were previously connected to the respective foreign node before the foreign node was not operational;
establish communication with the second one or more user equipment devices such that the system manages the established communications with the first one or more user equipment devices and the second one or more user equipment devices; and
during a second time frame after the first time frame:
determine that the respective foreign node has become operational based on a health check message received from the respective foreign node; and
based on the determination that the respective foreign node has become operational:
utilize the recorded data to identify the second one or more user equipment devices that were previously connected to the respective foreign node and to which communication has been established;
re-establish communication with the respective foreign node after the respective foreign node has become operational, such that additional health check messages are able to be received from the respective foreign node; and
cause the second one or more user equipment devices to re-establish communication with the respective foreign node.

14. The non-transitory processor-readable storage medium of claim 13, wherein each health check message of the one or more health check messages further comprises:
a list of one or more user equipment devices in communication with a foreign node that originated the health check message.

15. The non-transitory processor-readable storage medium of claim 14, wherein the list of one or more user equipment devices include at least one network address for each user equipment device in the list of one or more user equipment devices.

16. The non-transitory processor-readable storage medium of claim 13, wherein the one or more health check messages are received periodically.

17. The non-transitory processor-readable storage medium of claim 13, wherein the computer-executable instructions, when executed by the at least one processor to determine that the respective foreign node has become operational, further cause the at least one processor to:
detect that the foreign node has transmitted at least one health check message after the first time frame.

18. The non-transitory processor-readable storage medium of claim 13, wherein the system further comprises a session border controller.

19. The non-transitory processor-readable storage medium of claim 13, wherein the system further comprises a proxy call session control function.

20. The non-transitory processor-readable storage medium of claim 13, wherein beginning communication with the identified one or more user equipment devices comprises transmitting a SIP request.

\* \* \* \* \*